United States Patent Office 3,124,581
Patented Mar. 10, 1964

3,124,581
SUBSTITUTED QUINACRIDINE-12,14-DIONES AND THE PRODUCTION THEREOF
Hans Bohler, Rheinfelden, and Fritz Kehrer, Basel, Switzerland, assignors to Sandoz Ltd., Basel, Switzerland
No Drawing. Filed May 29, 1961, Ser. No. 113,133
Claims priority, application Switzerland June 1, 1960
2 Claims. (Cl. 260—279)

This invention relates to substituted quinacridine-12,14-diones and to a process for the production thereof. For this purpose a 4,6-diarylamino-isophthalic acid or its ester of the general formula

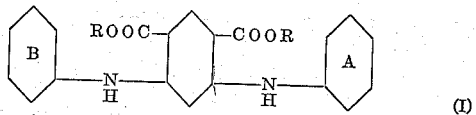

in which at least one of the nuclei A and B contains at least one substituent and R represents hydrogen or a hydrocarbon radical is heated in an acid condensing agent and if necessary an organic solvent.

4,6-diarylamino-isophthalic acids and their esters are known compounds. They can be produced by condensing in the known manner 1 mol of a 4,6-dihalogeno-isophthalic acid or its ester, simultaneously or in either order, with 1 mol of an aromatic amine in which at least one ortho position to the amino group is free and 1 mol of the same or a different aromatic amine or of a mixture of aromatic amines of the same type. The condensation can be carried out, for example, by the method of Eckert and Seidel (J. pr. Chem. 102, 353, 1921) or by that of Belgian Patent 592,341 in a polar solvent or a mixture of solvents such as water, mono- or polyalcohols, such as glycerine or ethylene glycol, ethylene or propylene carbonate, or water-ethylene glycol mixtures or water-glycerine mixtures in presence of copper or a copper compound and of an acid binding agent in the pH region of 2 to 12, but preferably between pH 3 and 9, and at temperatures above 70° C., e.g. between 70° and 160° C.

The condensation giving the 4,6-diarylamino-isophthalic acid can be carried out in one or two steps. If the two-step method is employed, it is advisable to isolate the 4-halogeno-6-arylamino-isophthalic acid obtained in the first step and then to condense with a further mol of amine, using for this second step the same amine or a different amine or mixture of amines. Examples of suitable amines are aminobenzene, 2-, 3- or 4-methyl-, methoxy-, fluoro-, chloro-, bromo-, iodo-, cyano-, trifluoromethyl-, methyl-sulfonyl-, nitro-, phenylsulfonyl-, acetylamino- or benzoyl-amino-1-aminobenzenes, the 2-, 3- or 4-carboxylic acid methyl esters or sulfonic acid methyl esters of amino-benzenes which may be substituted by a further substituent of the same group, trichloroaminobenzene, α-naphthylamine, β-naphthylamine, methyl-, methoxy-, fluoro-, chloro-, bromo-, iodo-, cyano-, trifluoromethyl-, methylsulfonyl-, nitro-, phenylsulfonyl-, acetylamino- or benzoylaminonaphthylamines, carboxylic acid methyl esters or sulfonic acid methyl esters of naphthylamines, α- and β-aminoanthraquinones, aminocarbazole or aminopyrene and their substitution products.

Suitable copper compounds are e.g. cupric acetate, chloride, sulfate, oxide or hydroxide, cuprous oxide or cuprous chloride, organic copper salts such as copper octoate, copper benzoate, or the copper salt of 4,6-dihalogeno-isophthalic acid, while as copper Raney copper is preferably used. It is advantageous to employ a small amount of the copper salt or Raney copper, e.g. 1 to 10% on the weight of the 4,6-dihalogeno-isophthalic acid; but an equimolar amount of the copper compound can be used if desired.

The following may be named as examples of suitable acid binding agents: sodium and potassium carbonate, bicarbonate and acetate, monosodium, monopotassium, disodium and dipotassium phosphate, borax or an excess of the aromatic amine used in the process. The acid binding agent is added at the start of the reaction, or in small portions in solid, finely pulverized form or in a solution during the course of the reaction. In the latter case solutions of sodium or potassium hydroxide can be employed as acid binding agents. The acid binding agent is added in an amount just sufficient to maintain the pH value of the reaction mixture within the appropriate limits. The separation of the reaction mixture, which depending on the conditions can be directed so as to yield predominantly monocondensation products, e.g. 4-bromo-6-arylamino-isophthalic acid, or dicondensation products, e.g. 4,6-diarylamino-isophthalic acid, is effected by dissolving the crude product in dilute sodium hydroxide solution and fractional precipitation with acid. With decreasing pH value the reaction products are precipitated as technically pure compounds in the sequence 4,6-diarylamino-isophthalic acid, 4-halogeno-6-arylamino-isophthalic acid and 4,6-dihalogeno-isophthalic acid. The 4-halogeno-6-arylamino-isophthalic acid is e.g. condensed in water, preferably at boiling temperature, with a further mol of amine which may be the same as, or different from, the aromatic amine used in the first step of the condensation reaction, or with a mol of a mixture of amines.

The ring closure yielding the quinacridone is effected by heating the 4,6-diarylamino-isophthalic acid or its ester (I) at temperatures above 70° C. and preferably up to 250° C. with an acid condensing agent.

The following may be named as examples of acid condensing agents: compounds of the general formula Z—SO$_3$H where Z represents e.g. OH, -o-alkyl or -o-aryl, more especially —O—CH$_3$ or

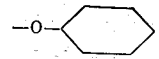

or a hydrocarbon radical such as alkyl, particularly one with 1 to 4 C-atoms, phenyl or naphthyl, and also polyphosphoric acids, especially those with a P$_2$O$_5$ content of more than 75%. The other condensing agents are employed preferably in concentrated form, sulfuric acid in about 5 to 100% strength or more specifically 50 to 100%. These condensing agents can be diluted with polar liquids containing one or more protonizable electron pairs, namely the solvents defined as Bronsted-Lowry bases (cf. Glasstone, S., The Elements of Physical Chemistry, p. 495, London, 1950; Hine, J., Physical Organic Chemistry, p. 53, New York, 1956). This group of solvents includes water, monovalent and multivalent alcohols, phenols, ketones and carboxylic acids.

Acid condensing agents of especial interest are polyphosphoric acid, sulfuric acid, methanesulfonic acid and toluenesulfonic acid. Cyclization is carried out at temperatures ranging from about 70° to about 250° C., or preferably at 100–200° C.

The ratio by weight of 4,6-diarylamino-isophthalic acid to acid condensing agent can be varied within wide limits, but it is preferable to remain within the limits 1:4 to 1:20.

The quinacridine-12,14-diones formed are already precipitated whilst the reaction medium is cooling. Alternatively, the reaction medium can be run into water containing, if necessary, alkalis, and the resulting precipitate filtered with suction, washed with water and dried.

The quinacridone can be purified, for example, by dissolving it in a mixture of alcoholic potassium hydroxide solution and dimethyl sulfoxide and then precipitating it from the solution with water.

Alternatively, it can be purified by recrystallization from solution in a solvent such as dimethyl formamide, dimethyl acetamide, dimethyl sulfoxide, piperidine, pyrrol, pyrrolidone, pyridine, ethylene glycol or sulfuric acid, or by dissolving it in concentrated sulfuric acid and running the solution into ice-water.

The new substituted quinacridine-12,14-diones thus obtained have the general formula

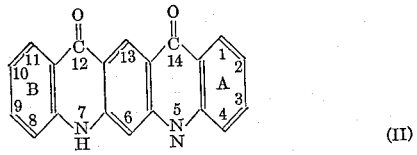

(II)

in which at least one of the nuclei A or B contains at least one substituent.

These compounds can be used for the dyeing of addition polymers or polycondensation products e.g. polyvinyl chloride, polyethylene, polypropylene, polyamides, e.g. polycaprolactam, polycondensates of diamines, especially hexamethylene diamine, and dicarboxylic acids, e.g. adipic acid, or poly-ω-aminorundecanoic acid or linear aromatic polyesters, e.g. of terephthalic acid and ethylene glycol; aqueous synthetic resin dispersions for surface coatings; printing inks; lacquer media; spinning solutions of cellulose xanthate (viscose rayon) or cellulose acetate (secondary acetate or triacetate); rubber or high-grade papers; and for pigment printing on textiles.

In spun viscose, acetate and triacetate, pigment prints on textiles, surface coating materials, synthetic resin dispersions and polyvinyl chloride the compounds of this invention are characterized by brightness of shade and very good light fastness combined with good all-round fastness. Especially notable are their excellent resistance to top finishes in latex (synthetic resin) and lacquer coatings, the complete absence of migration in polyvinyl chloride, and the good to very good fastness of the dyeings in viscose rayon, acetate, triacetate and of the prints on textiles to water, washing, perspiration, cross dyeing, alkalis, acids, peroxide bleaching and dry cleaning.

In the following examples the parts and percentages are by weight and the temperatures in degrees centigrade.

*Example 1*

28.2 parts of 4,6-dichloro-isophthalic acid, 480 parts of water, 0.5 part of copper acetate, 92 parts of 4-methyl-aminobenzene and 33.6 parts of anhydrous potassium carbonate are boiled with stirring for 5 hours under reflux. After cooling to room temperature, any unreacted 4-methylaminobenzene is filtered off. By acidifying the filtrate at 70–80° with dilute acetic acid (acid to litmus paper), then with dilute hydrochloric acid (weakly acid to Congo paper) and finally with concentrated hydrochloric acid (strongly acid to Congo paper), 4,6-di-(4'-methylphenylamino)-iso-phthalic acid, 4-chloro-6-(4'-methylphenylamino)-iso-phthalic acid and unchanged 4,6-dichloro-iso-phthalic acid are successively precipitated. In this way these compounds can be obtained individually. 1 part of the 4,6-di-(4'-methyl-phenylamino)-isophthalic acid thus obtained, 20 parts of monochloroacetic acid and 0.2 part of concentrated sulfuric acid are stirred together under reflux for 30 minutes at about 182°. After cooling to 100° the reaction mixture is diluted with 50 parts of water and rendered alkaline with 30% sodium hydroxide solution. The yellow precipitate of 2,10-dimethyl-quinacridine-12,14-dione is filtered off while still warm, washed free of alkali with water and purified as follows: 1 part of the crude product is dissolved in a mixture of 25 parts of dimethyl sulfoxide and 3.5 parts of 10% alcoholic potassium hydroxide solution, the blue-green solution filtered free from any impurities present and water at 70–90° added until precipitation is initiated, the pure pigment afterwards being filtered off at room temperature. Purification can also be effected by recrystallizing from solution in a polar solvent, e.g. dimethyl formamide, dimethyl sulfoxide, piperidine, pyridine, pyrrol, pyrrolidone, ethylene glycol or sulfuric acid, or by dissolving in concentrated sulfuric acid and running the solution into ice-water.

*Example 2*

2 parts of 4,6 - di - (4'-chlorophenylamino)-isophthalic acid-diethyl ester (produced according to the particulars of the Belgian Patent No. 592,341) are heated with 30 parts of polyphosphoric acid of 85% $P_2O_5$ content at 155–160° for 30 minutes. The end product, 2,10-dichloroquinacridine-12,14-dione is precipitated by diluting the polyphosphoric acid with water at 80–100° and purified according to the particulars given in Example 1.

An almost quantitative yield of 2,10-dichloroquinacridine-12,14-dione is obtained. This compound is an excellent pigment for polyvinyl chloride.

*Example 3*

94.4 parts of 4,6-dichloro-isophthalic acid, 885 parts of ethylene glycol, 310 parts of aniline, 103 parts of glacial acetic acid and 1.6 parts of copper acetate are heated with stirring for 12 hours at 140°. The reaction mixture is acidified with concentrated hydrochloric acid (acid to Congo paper) at room temperature, poured onto 3000 parts of water and filtered. The washed filtrate is dissolved in 1500 parts of water and 38 parts of sodium carbonate at 70–80°, filtered again at room temperature and the filtrate precipitated at 70–80° with dilute acetic acid, dilute hydrochloric and concentrated hydrochloric acid according to the particulars of Example 1.

4.4 parts of the dried 4-chloro-6-phenylamino-isophthalic acid obtained in this way are boiled with 120 parts of water, 23 parts of 4-methylaminobenzene, 3.2 parts of anhydrous potassium carbonate and 0.15 part of copper acetate for 1 hour with stirring under reflux. The excess amine is then removed with steam. After filtration and acidification, 4-phenylamino-6-(4'-methyl-phenylamino)-isophthalic acid is precipitated with dilute acetic acid (acid to litmus paper) and the unreacted 4-chloro-6-phenylamino-isophthalic acid with dilute hydrochloric acid (weakly acid to Congo paper).

The dried 4 - phenylamino-6-(4'-methyl-phenylamino)-isophthalic acid is cyclized according to the particulars given in Example 2 or as follows:

2 parts of 4 - phenylamino-6-(4'-methyl-phenylamino)-isophthalic acid are heated with 20 parts of toluenesulfonic acid with stirring for 30 minutes at 170°. After cooling to room temperature the solution is poured into 125 parts of water, heated to 80–90°, adjusted to a phenolphthaleic alkaline reaction with concentrated sodium hydroxide solution and the dyestuff filtered while still warm. The greenish yellow 2-methylquinacridine-12,14-dione is washed with water and dimethylformamide and dried; it is then dissolved in a mixture of dimethyl sulfoxide and potassium hydroxide solution and reprecipitated from solution as described in Example 1.

An equal amount of methanesulfonic acid can be used in place of toluenesulfonic acid.

*Example 4*

28.2 parts of 4,6-dichloro-isophthalic acid, 480 parts of water, 0.5 part of copper acetate (106 parts of 4-methoxyaminobenzene and 33.6 parts of anhydrous potassium carbonate are heated together with stirring for 2½ hours under reflux. The resulting 4,6-di-(4'-methoxyphenylamino)-isophthalic acid can be isolated according to the procedure of Example 1.

3 parts of the dried 4,6-di-(4'-methoxy-phenylamino)-isophthalic acid are added to 45 parts of polyphosphoric acid with stirring at 90–100°, the solution heated to 120–130° for 5 minutes, and the dyestuff precipitated and isolated by diluting with water. The 2,10 dimethoxy-quinacridine-12,14-dione is obtained in good yield and can be purified according to the particulars of Example 1.

In the following table further new substituted quinacridine-12,14-diones are set forth. They are obtained according to the particulars of the previous examples by ring closure of a 4,6-diarylamino-isophthalic acid of the formula

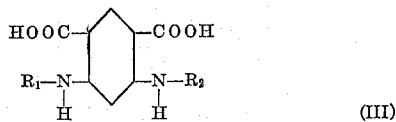

or one of its esters, preferably one with a monovalent aliphatic alcohol with 1-3 C-atoms. In this formula $R_1$ and $R_2$ represent the identical or different aryl radicals. The quinacridine-12,14-diones obtained are characterized by these radicals $R_1$ and $R_2$.

| Example No. | R¹ | R² |
|---|---|---|
| 5 | 3-methylphenyl | 3-methylphenyl. |
| 6 | do | phenyl. |
| 7 | 2-methylphenyl | Do. |
| 8 | 3-methoxyphenyl | 3-methoxyphenyl. |
| 9 | 2-methoxyphenyl | phenyl. |
| 10 | 4-methoxyphenyl | 4-methylphenyl. |
| 11 | do | 4-chlorophenyl. |
| 12 | 3-chlorophenyl | 3-chlorophenyl. |
| 13 | 4-chlorophenyl | 4-bromophenyl. |
| 14 | 4-iodophenyl | 4-iodophenyl. |
| 15 | 3-bromophenyl | 3-bromophenyl. |
| 16 | 4-fluorophenyl | 4-fluorophenyl. |
| 17 | 2-fluorophenyl | 2-fluorophenyl. |
| 18 | 2-chlorophenyl | 2-chlorophenyl. |
| 19 | 4-bromophenyl | 4-bromophenyl. |
| 20 | 2,4-dichlorophenyl | 2,4-dichlorophenyl. |
| 21 | 2,5-dichlorophenyl | 2,5-dichlorophenyl. |
| 22 | 3,4-dichlorophenyl | 3,4-dichlorophenyl. |
| 23 | 2,3-dichlorophenyl | 2,3-dichlorophenyl. |
| 24 | 3,4-dichlorophenyl | 2,4-dibromophenyl. |
| 25 | 2,4-dimethylphenyl | 2,4-dimethylphenyl. |
| 26 | 2,5-dimethylphenyl | 2,5-dimethylphenyl. |
| 27 | do | 2,4-dimethylphenyl. |
| 28 | 2,4,5-trichlorophenyl | 2,4,5-trichlorophenyl. |
| 29 | do | phenyl. |
| 30 | 2,4-dimethoxyphenyl | 2,4-dimethoxyphenyl. |
| 31 | do | 2,5-dimethoxyphenyl. |
| 32 | phenoxyphenyl | 4-phenoxyphenyl. |
| 33 | phenyl | Do. |
| 34 | 4-acetylaminophenyl | 4-acetylaminophenyl. |
| 35 | 2-acetylaminophenyl | phenyl. |
| 36 | 3-cyanophenyl | 3-cyanophenyl. |
| 37 | 4-nitrophenyl | 4-nitrophenyl. |
| 38 | 4-methylsulfonylphenyl | 3-methylsulfonylphenyl. |
| 39 | 3-trifluoromethylphenyl | 3-trifluoromethylphenyl. |
| 40 | 4-carboxyethylphenyl | 4-carboxyethylphenyl. |
| 41 | 4-phenylsulfonylphenyl | 4-phenylsulfonylphenyl. |
| 42 | 3-benzoylaminophenyl | 3-benzoylaminophenyl. |
| 43 | 4-sulfomethylphenyl | 4-sulfomethylphenyl. |
| 44 | phenyl | 4-methylphenyl. |
| 45 | do | 3-methoxyphenyl. |
| 46 | do | 4-methoxyphenyl. |
| 47 | do | 2-chlorophenyl. |
| 48 | do | 3-chlorophenyl. |
| 49 | do | 4-chlorophenyl. |
| 50 | do | 2-fluorophenyl. |
| 51 | do | 3-fluorophenyl. |
| 52 | do | 4-fluorophenyl. |
| 53 | do | 2-bromophenyl. |
| 54 | do | 3-bromophenyl. |
| 55 | do | 4-bromophenyl. |
| 56 | do | 4-iodophenyl. |
| 57 | do | 3-iodophenyl. |
| 58 | do | 3-benzoylaminophenyl. |
| 59 | phenyl | 4-sulfomethylphenyl. |
| 60 | do | 4-phenylsulfonylphenyl. |
| 61 | do | 4-carboxyethylphenyl. |
| 62 | do | 3-cyanophenyl. |
| 63 | do | 2-nitrophenyl. |
| 64 | do | 3-nitrophenyl. |
| 65 | do | 4-nitrophenyl. |
| 66 | do | 3-trifluoromethylphenyl |
| 67 | do | 3-methylsulfonylphenyl. |
| 68 | do | α-napththyl. |
| 69 | do | β-napthhyl. |
| 70 | α-naphthyl | α-naphthyl. |
| 71 | β-naphthyl | β-naphthyl. |
| 72 | α-naphthyl | Do. |
| 73 | α-anthraquinonyl | α-anthraquinonyl. |
| 74 | β-anthraquinonyl | β-anthraquinonyl. |
| 75 | phenyl | α-anthraquinonyl. |
| 76 | do | β-anthraquinonyl. |
| 77 | pyrenyl | pyrenyl. |
| 78 | phenyl | carboazyl. |
| 79 | do | pyrenyl. |

Having thus disclosed the invention what we claim is:
1. Quinacridine-12,14-dione of the formula

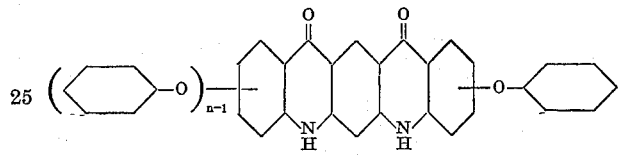

wherein $n$ is a whole number from 1 to 2 inclusive.

2. Quinacridine-12,14-dione of the formula

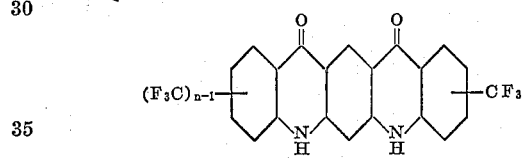

wherein $n$ is a whole number from 1 to 2 inclusive.

References Cited in the file of this patent
UNITED STATES PATENTS

| 2,821,529 | Struve | Jan. 28, 1958 |
| 2,821,530 | Struve | Jan. 28, 1958 |
| 2,934,512 | Godshalk | Apr. 26, 1960 |
| 2,979,480 | Piloni et al. | Apr. 11, 1961 |

FOREIGN PATENTS

| 1,233,785 | France | May 9, 1960 |
| 1,237,416 | France | June 20, 1960 |

OTHER REFERENCES

Venkataraman, Synthetic Dyes, pages 925-6 (1952).

UNITED STATES PATENT OFFICE
CERTIFICATE OF CORRECTION

Patent No. 3,124,581            March 10, 1964

Hans Bohler et al.

It is hereby certified that error appears in the above numbered patent requiring correction and that the said Letters Patent should read as corrected below.

Column 3, lines 8 to 14, the right-hand side of the formula should appear as shown below instead of as in the patent:

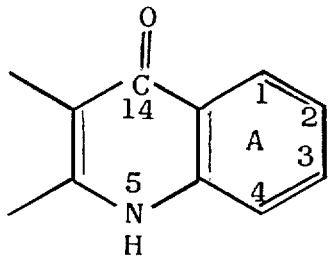

same column 3, line 22, for "poly-ω-aminorundecanoic" read -- poly-ω-amino-undecanoic --; column 4, line 60, for "acetate (106" read -- acetate, 106 --.

Signed and sealed this 9th day of February 1965.

(SEAL)
Attest:

ERNEST W. SWIDER
Attesting Officer

EDWARD J. BRENNER
                                  Commissioner of Patents